United States Patent [19]

Kobayashi et al.

[11] 4,403,971
[45] Sep. 13, 1983

[54] INTAKE DUCT FOR AN OUTBOARD ENGINE

[75] Inventors: Seiji Kobayashi; Hiroshi Harada, both of Shizuoka, Japan

[73] Assignee: Yamaha Hatsudoki Kabushiki Kaisha, Iwata, Japan

[21] Appl. No.: 260,168

[22] Filed: May 4, 1981

[30] Foreign Application Priority Data

Jun. 5, 1980 [JP] Japan .................. 55-59687

[51] Int. Cl.³ .......................................... B63H 5/12
[52] U.S. Cl. ................................................. 440/88
[58] Field of Search ............... 440/77, 88, 89, 900; 114/211

[56] References Cited

U.S. PATENT DOCUMENTS 3,195,530  7/1965  Heidner .............................. 440/77
3,610,198  10/1971  Alexandrowicz .................. 440/88

FOREIGN PATENT DOCUMENTS 53-9696   1/1978  Japan .................................. 440/88
54-163496 11/1979 Japan .................................. 440/88

Primary Examiner—Trygve M. Blix
Assistant Examiner—Jesús D. Sotelo
Attorney, Agent, or Firm—Donald D. Mon

[57] ABSTRACT

An intake duct for an outboard engine has a cowling, the upper rear portion of which has a recess that faces upwardly and backwardly. A cover plate covers the top of the recess so the recess opens rearwardly. Intake ports are formed at the right and left sides of the recess, near the upper elevation thereof, in the vicinity of the cover plate. At the front portion of the recess there is an annular wall which stands upright in the shape of a funnel to form an intake port that opens upwardly, facing the cover plate.

4 Claims, 5 Drawing Figures

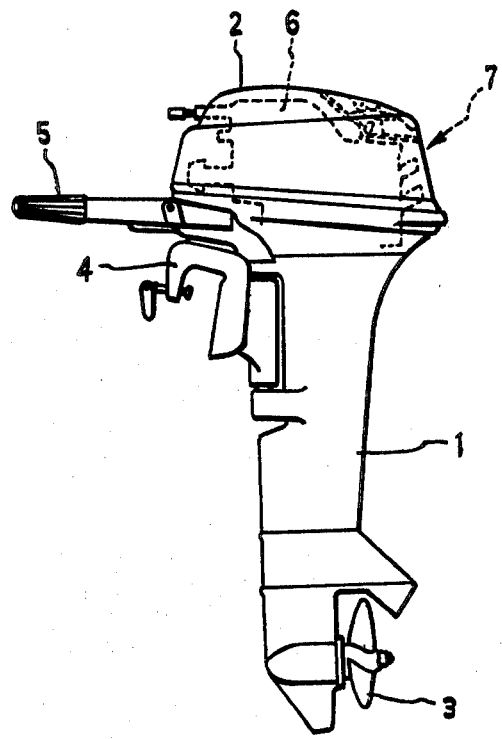
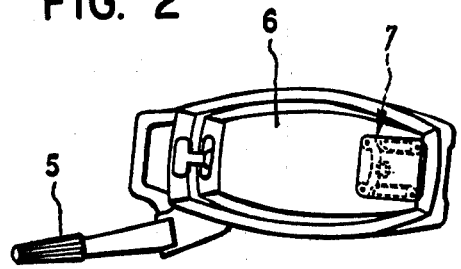
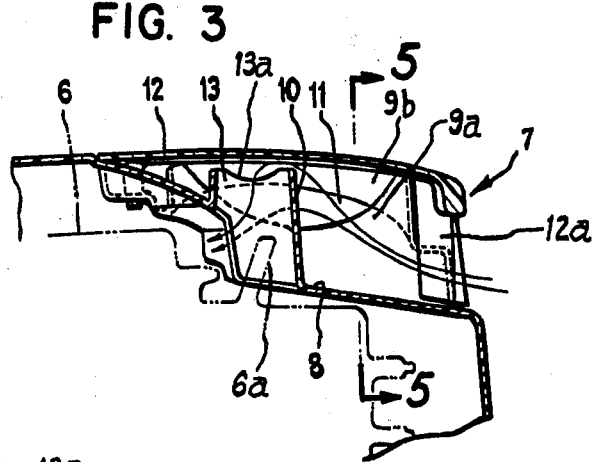
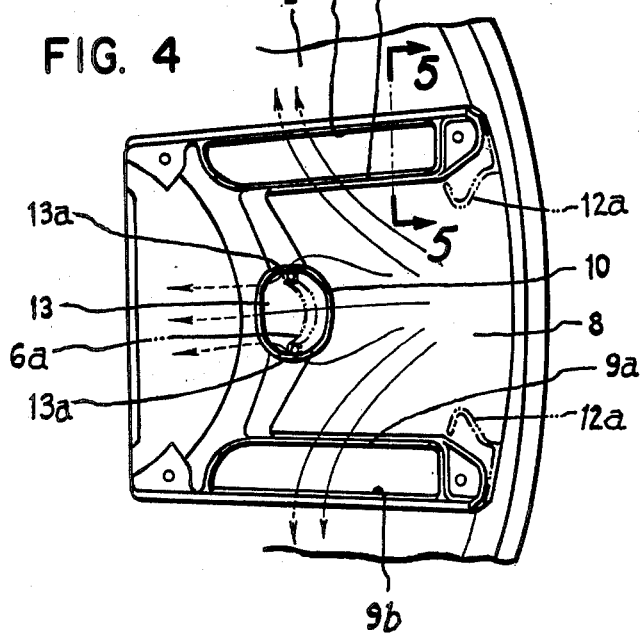
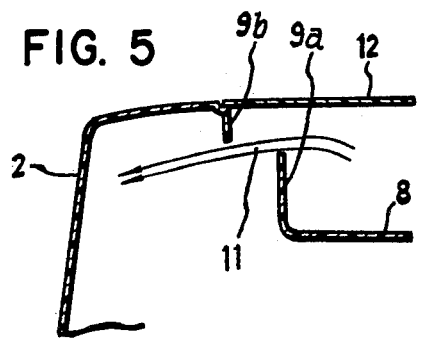

INTAKE DUCT FOR AN OUTBOARD ENGINE

FIELD OF THE INVENTION

The present invention relates to an intake duct for an outboard engine. More particularly, the present invention relates to an improved intake duct which is provided in the cowling of an outboard engine.

BACKGROUND OF THE INVENTION

The entry of intake air into an outboard engine is performed through an intake duct which is provided at an upper portion of the rear end of a cowling. Water spray splashed up in the course of navigation may enter the intake duct together with the entering intake air. The water spray is entrained by the intake air into the engine or onto the electric equipments of the engine thereby to cause engine troubles. In order to solve this problem, it is effective to provide intake ports in the intake duct at the upper portions of both the right and left walls. Even in such a construction, however, if the displacement of the engine is increased, the vacuum that will be established in the cowling is accordingly raised to a remarkably high level thereby to tend to increase the entry of water into the cowling.

It is, therefore, an object of the present invention to provide an intake duct for an outboard engine, which avoids the aforementioned problem, which prevents much entry of water into the cowling and in which the entry water, if any, is unlikely to wet the engine or its electric equipment or to reach the intake system of the engine.

BRIEF DESCRIPTION OF THE INVENTION

In order to attain the aforementioned objective, the intake duct for an outboard engine according to the present invention is characterized in that the upper side of a cowling has its rear portion formed with a recess which opens upwardly and backwardly. The upwardly open side of the recess is covered with a cover plate. Both the side walls at the right and left sides (which define said recess), have their upper portions formed with intake ports in the vicinity of said cover plate. There is provided at a front portion of the recess an annular wall which stands upright in a shape of a funnel to form an intake port which opens upwardly to face the cover plate.

The present invention will be described in detail in the following in connection with the embodiment thereof with reference to the accompanying drawings, in which:

BRIEF DESCRIPTION OF THE DRAWINGS

FIG. 1 is a side elevation showing an outboard engine which is equipped with an intake duct according to the present invention;

FIG. 2 is a top plan view showing the same outboard engine;

FIG. 3 is a longitudinal section showing the intake duct for the outboard engine according to the embodiment of the present invention;

FIG. 4 is a top plan view showing the intake duct with its cover plate is removed; and FIG. 5 is a sectional view of FIGS. 3 and 4, as viewed in the direction of arrow V—V therein.

DETAILED DESCRIPTION OF THE INVENTION

In FIGS. 1 and 2, a casing 1 is equipped with a cowling 2 at its upper portion and with a propulsion screw 3 at its lower portion. A bracket 4 provides a mounting means for mounting to a hull, and there is a steering handle 5. The engine is mounted in cowling 2 together with its electric equipment 6. Cowling 2 has, at its rear portion an intake duct 7, at its upper portion.

FIGS. 3 to 5 show intake duct 7 in detail. It is mounted at the upper portion of the rear portion of cowling 2 in a manner to form a recess. This recess forming intake duct 7 is defined by a bottom wall 8, two inner and outer side walls 9a and 9b one pair being located at each of the sides of bottom wall 8, and a funnel-shaped annular wall 10 which is disposed at a front portion opposite from the open end. Of inner and outer side walls 9a and 9b at both sides, the upper portions of inner side walls 9a and the lower portions of outer side walls 9b are respectively arcuately notched to form intake ports 11 such that the two notched portions have overlapped portions, as viewed sideways. A cover plate 12 is mounted on the upwardly open side of the recess. Cover plate 12 is equipped at both sides of the open end at its rear portions with throttling portions 12a which are operative to throttle the intake passage of the air, as indicated by broken lines in FIG. 4. Funnel shaped annular wall 10 at the front portion of the recess is formed at its upper portion with an intake port 13, which opens upwardly to face cover plate 12. Intake port 13, thus formed, has an arcuate notch 13a at both sides of its upper end. An engine hanger 6a protrudes into funnel-shaped annular wall 10 so that this annular wall 10 provides for an escape (clearance) for engine hanger 6a.

In intake duct 7 as thus far described, air sucked through the rear opening is once throttled at throttling portions 12a and is then allowed to expand. Then, the airflow is divided to the right and left by the funnel-shaped annular wall 10 so that it is deflected toward side walls 9a and 9b at both sides. When the intake air is divided to the right and left in that way, entrained water droplets having a larger inertia do not sufficiently follow the deflection of the air but go straight on to wet the surface of annular wall 10. As a result, a considerable amount of water will be removed from air flowing into the cowling from intake ports 11 which are formed by the notched portions of the side walls 9a and 9b at both sides. Moreover, the air sucked from intake ports 11 into cowling 11 flows substantially in a horizontal direction, as shown in FIG. 5, to impinge upon the inner surfaces of both side walls of cowling 2 so that the water, if any, will wet those wall surfaces and flow down. As a result, the water is prevented from directly wetting the engine and its electric equipment 6, and from reaching intake system of the engine.

The air which has impinged upon funnel-shaped annular wall 10 partially flows upwardly into intake port 13 through the gap from the cover plate 12, and partially flows into intake port 13 from notches 13a at both sides. In this case the water droplets, having a larger inertia do not follow the deflection of the air flow but instead wet the surface of the annular wall 10 so that a considerable amount of water is removed. Intake port 13 of funnel-shaped annular wall 10 is effective to damp the increase in the vacuum in cowling 2, especially the increase in the vacuum resulting from the increase in the displacement of the engine. Notches 13a formed at both sides of annular wall 10 are made especially operative to smoothen the introduction of the air so that it can further effectively damp the increase in the vacuum.

The side walls forming intake ports 11 are sufficient even if they are constructed of a single wall. When the side walls are constructed of two walls 9a and 9b as in the aforementioned embodiment, the resultant intake ports 11 provide a kind of labyrinth structure. The air passing therethrough enters into the labyrinths, while being deflected to some extent, so that it can be made partially to impinge upon outer side walls 9b. If, at this time, water is contained in the air, it wets outer side walls 9b so that it goes no farther into the cowling. Thus entry of water into the cowling can be further reduced. On the other hand, generally speaking, if the cowling is notched, its strength is accordingly reduced, thereby to cause structural weakness in case the outboard engine is to be tilted up by manually gripping the opening of the intake duct. It is, therefore, necessary to provide a counter-measure, in which the wall thickness of the cowling is increased as a whole. However, the said insufficiency in the strength can be averted without any increase in the wall thickness by making the aforementioned double-wall structure.

As has been described hereinbefore, an intake duct for an outboard engine according to the present invention is constructed such that the upper side of the cowling has its rear portion formed with a recess that opens upwardly and backwardly. The upwardly open side of the recess is covered with the cover plate. Both the right and left sidewalls, which define the recess, have their upper portions formed with intake ports in the vicinity of the cover plate. The annular wall provided at the front portion stands upright in a shape of a funnel to form an intake port which opens upwardly to face the cover plate. As a result, even in case the air to be sucked into the intake duct entrains water, it is cleared of a considerable amount of water by the walls which form the recess before it enters the cowling from the intake ports. Even if, moreover, some entrained water enters the cowling from the intake ports, it impinges upon both side walls of the cowling so that it fails to attack the engine and its electric equipment. As a result, it is possible to eliminate engine troubles due to wetting of the engine with water or due to suction of water into the intake system. Because the intake ports are formed not only at the upper portions of both the right and left sides of the recess but also at the upper portion of the funnel-shaped annular wall at the front portion, it is possible to prevent remarkable increase in the vacuum in the cowling from being caused even by the increase in the displacement of the engine and to prevent the water from entering as a result of the increase in the vacuum. On the other hand, the space formed by the funnel-shaped annular wall at the front portion can play a useful role as an escape for the engine hanger.

This invention is not to be limited by the embodiment shown in the drawings and described in the description, which is given by way of example and not of limitation, but only in accordance with the scope of the appended claims.

We claim:

1. An intake duct for an outboard engine, said engine having a cowling atop it, said cowling having a recess in its rear top portion above said engine, a right and a left first side walls, an opening at the rear, and a back wall opposed to said opening; a cover plate enclosing the top of said recess, and completing, with said cowling, said rear opening; a side intake port above each of said first side walls and below said cover plate extending for a substantial length at an upper elevation adjacent to said cover plate, and opening into said cowling in a direction lateral to said cowling; an uprightly-standing annular wall rising from said cowling with an open end having a peripheral edge facing upwardly toward and spaced from said cover plate and passing through said cowling to form a central intake port, a notch is provided in the upper end of said annular wall at its left hand side and at its right hand side, said annular wall being in the path of air entering from said rear opening; air flow into said recess flowing through said rear opening and impinging on said back wall and on said annular wall, and then dividing to flow sidewardly to and through said side intake ports in an initial direction lateral to said cowling, and also flowing up and over said edge and said central intake port.

2. An intake duct according to claim 1 in which baffles are formed at the side intake ports to cause a change in direction of the air flow through said side ports.

3. Apparatus according to claim 1 in which said annular wall is funnel-like.

4. Apparatus according to claim 1 in which said annular wall is funnel-like.

* * * * *